United States Patent [19]
Tamura

[11] 3,940,182
[45] Feb. 24, 1976

[54] SEAT POSITION CONTROL MECHANISM HAVING A POSITION MEMORY ELEMENT

[75] Inventor: Takeo Tamura, Tokyo, Japan

[73] Assignee: Nissan Motor Co., Ltd., Yokohama, Japan

[22] Filed: Aug. 29, 1974

[21] Appl. No.: 501,781

[30] Foreign Application Priority Data
Aug. 31, 1973 Japan................................. 48-98535

[52] U.S. Cl. ................. 297/341; 297/379; 297/354
[51] Int. Cl.[2]........................................... A47C 1/02
[58] Field of Search ............ 297/340, 341, 379, 354

[56] References Cited
UNITED STATES PATENTS

| | | | |
|---|---|---|---|
| 2,737,229 | 3/1956 | Semar............................ | 297/341 X |
| 2,795,265 | 6/1957 | Albrecht............................. | 297/341 |
| 2,796,113 | 6/1957 | Lyon et al........................... | 297/341 |
| 2,942,646 | 6/1960 | Himka et al. ....................... | 297/341 |
| 3,695,695 | 10/1972 | Colucci.............................. | 297/341 |
| 3,811,726 | 5/1974 | Muraishi et al..................... | 297/341 |
| 3,814,476 | 6/1974 | Abbott............................. | 297/341 X |

*Primary Examiner*—James T. McCall
*Assistant Examiner*—Peter A. Aschenbrenner

[57] ABSTRACT

A vehicle seat assembly having a substantially horizontal seat member and a normally upright backrest pivoted relative to the seat member is locked in one of a plurality of selectable positions lengthwise of a stationary guide fixed to the vehicle floor. A seat position memory element is provided having a first latch which is selectively engageable with the stationary guide and a slide member which is slidably carried on the stationary guide. The slide member has a second latch which normally engages the stationary guide to lock the seat assembly in position and is disengaged therefrom when the backrest is folded forward to permit the seat assembly to move forward. A control shaft is rotatably carried on the slide member and arranged to coact with the first and second latches. Upon rotation of the control shaft, the first and second latches are disengaged from the stationary guide to move the seat to a selected position. Restoring of the control shaft causes the first and second latches to come into engagement with the stationary guide. When the backrest is folded forward to move the seat forward, the first latch remains engaged with the stationary guide while the second latch is disengaged therefrom. Upon return movement of the seat, the second latch comes into engagement with the stationary guide such that the seat assembly returns to the selected position.

2 Claims, 11 Drawing Figures

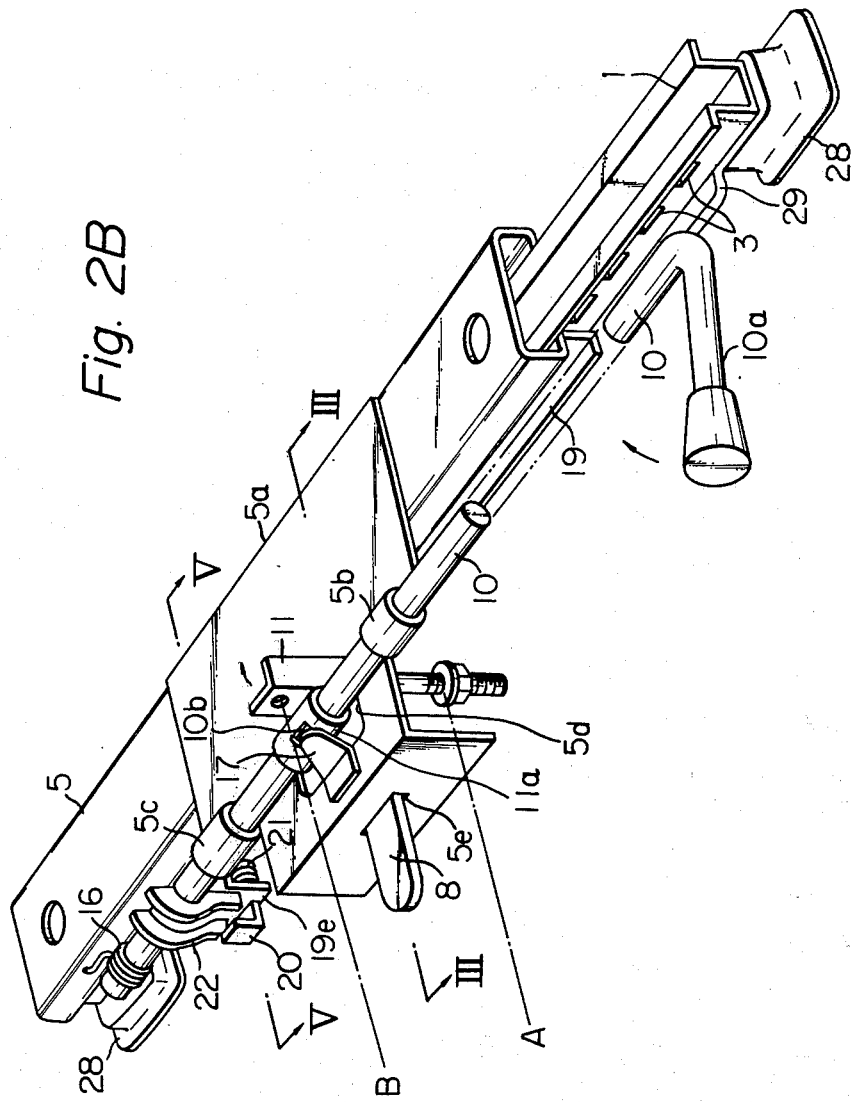

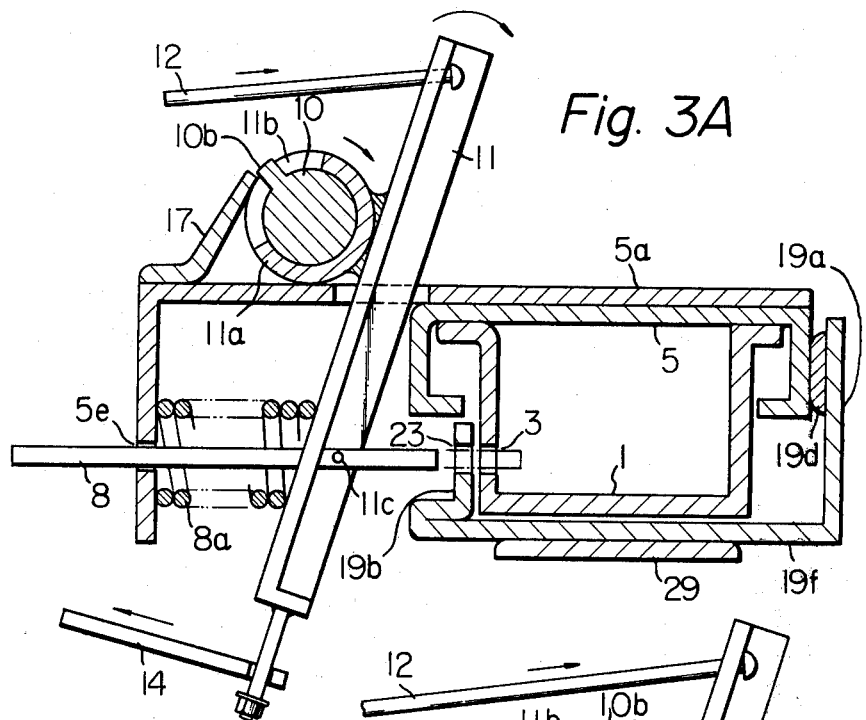
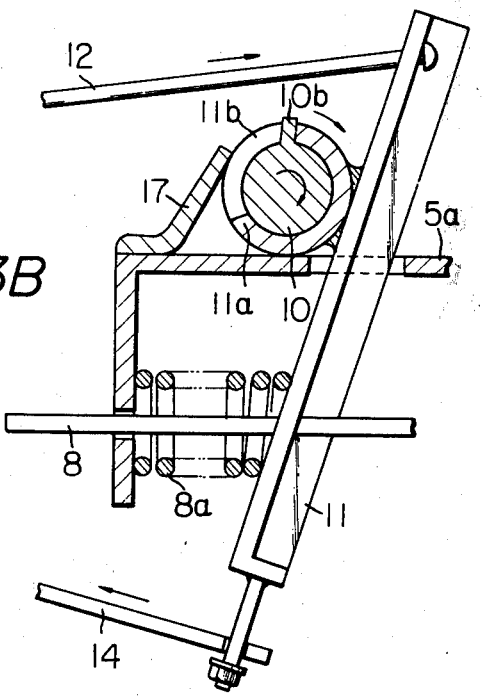

SEAT POSITION CONTROL MECHANISM HAVING A POSITION MEMORY ELEMENT

The present invention relates to seat position control mechanisms for motor vehicles whereupon the forward tilting of the backrest releases the latch mechanism automatically disengaging the seat from a selected seat position to permit forward movement of the seat and, more particularly to an improved seat position control mechanism in which the seat is automatically latched in its original position as the seat slides backward upon the return movement of the backrest.

In two-door model automobiles it is usual to provide front seats in which the back portion of the seat pivots forward to permit entry and egress to and from the rear seat of the vehicle. The front seat, when the backrest is upright, is latched in one of the selectable positions with respect to the vehicle floor to prevent inadvertent forward movement thereof during a sudden stop. Upon the forward tilting movement of the backrest, the latch mechanism is automatically released and the seat is allowed to slide forward to permit entry and egress to and from the rear seats of the vehicle. However, this arrangement introduces some inconvenience during entry and egress to the rear seats, because upon the return movement of the backrest, the seat slides back past the previously selected position and is latched in a new and undesired position. Therefore, the latch mechanism must be manually released and readjustment of the seat position made, every time the front seat is disengaged.

Therefore, an object of the present invention is to provide an improved seat position control mechanism which overcomes the above-mentioned disadvantages.

Another object of the invention is to provide a seat position memory device which is normally connected to a stationary guide fixed to the vehicle floor when the backrest is tilted forward to permit entry and egress to and from the rear seats and is disconnected from the stationary guide only when the seat position requires readjustment.

Other objects and features of the present invention will become apparent from the following description when taken in conjunction with the accompanying drawings, in which:

FIGS. 2A and 2B are perspective views showing detailed structures of the seat position control mechanism of the invention;

FIGS. 3A and 3B are cross-sectional views taken along the line III—III of FIG. 2B;

Figure 1:
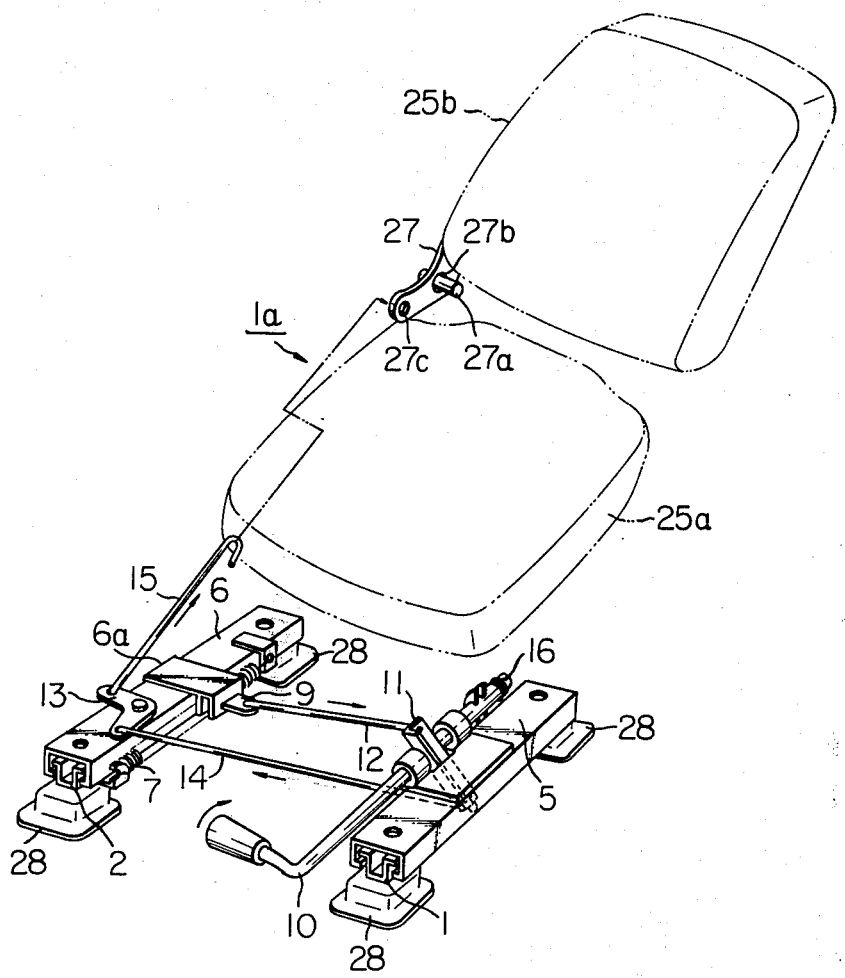
FIG. 1 is a general perspective view of the seat assembly in accordance with the present invention.

Reference is now made to the drawings and in particular to FIGS. 1 and 2, the numeral 1a denotes a motor vehicle seat assembly having substantially horizontal seat member 25a and a seat back member or backrest 25b including a conventional hockey stick shaped member 27. The backrest 25b is movable relative to seat member 25a in that hockey stick 27 is pivotally attached to seat member 25a by a pivot pin 27a extending into a hole 27b formed in the hockey stick 27. Slide members 5 and 6 are fixed below the opposing sides of the seat member 25a and are slidably engaged with stationary guides 1 and 2 on supports 28 fixed to the floor of the motor vehicle. A connecting wire 15 is coupled to one end of a generally "L" shaped flat member 13 pivotally disposed on the slide member 6 and to a hole 27c of the hockey stick 27 as illustrated in a broken line. The backrest 28 is thus forwardly tiltable to permit entrance to and exit from the rear passenger seat of the vehicle. The slide member 6 is urged forward by means of a coiled spring 7 with respect to the stationary guide 2 so that the seat member 25a is caused to move forward upon the backrest being folded forward.

A slide member 5 has on its upper surface a mounting plate 5a secured thereto at a position intermediate of the forward and backward ends thereof by welding. The mounting plate 5a laterally extends toward the slide member 6, has the intermediate portion thereof flared downwardly (FIG. 2B) and is formed with a pair of coaxially aligned sleeves 5b and 5c at the opposite ends thereof in parallel with the slide member 5. A control shaft 10 having at the forward end thereof a handle 10a which extends substantially at right angles has the diameter of the inner diameter of the sleeves 5b and 5c and extends therethrough so as to permit rotatable movement thereof by the handle portion 10a. A spring coil 16 is coupled at the rear end of the control shaft 10 and the slide member 5 so that control shaft 10 is normally urged in a counterclockwise direction. An upright lever 11 having integrally formed therewith a sleeve 11a extends through a hole 5d of the mounting plate 5a, with the sleeve 11a being rotatably disposed about the control shaft 10 (FIG. 3A). The sleeve 11a has an opening 11b which extends part of the circumference thereof and through which a lug 10b of the control shaft 10 extends and is normally in abutment with a stop member 17 secured to the mounting plate 5a. The stationary guide 1 has a plurality of equally spaced slots 3 arranged lengthwise thereof and the mounting plate 5a has a slot 5e on its downwardly flared portion in register with one of the slots 3. A latch 8 is operatively connected at the intermediate position thereof to the upright lever or link 11 by a connecting pin 11c, and slidably received in the slot 5e and engageable with slots 23 and 3 (FIG. 3A) with a spring 8a urging the latch 8 toward slots 3.

Figure 4:
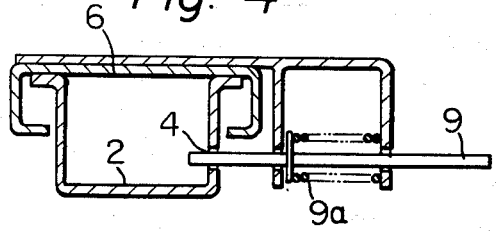
FIG. 4 is a cross-sectional view taken along the line IV—IV of FIG. 2A.

On the other hand, the stationary guide 2 has also a plurality of slots 4 arranged lengthwise thereof which correspond to the slots 3 of the stationary guide 1. The slide member 6 is provided with a latch 9 which is normally urged toward the stationary guide 2 by a spring 9a and slidably carried by a support member 6a secured to the slide member 6 so that latch 9 engages one of the slots 4 of the stationary guide 2 (FIG. 4). The upright link 11 has its upper end operatively connected to the latch 9 by a connecting wire 12 and has its lower end connected to the "L" shaped member 13 by a connecting wire 14.

Figure 2A:
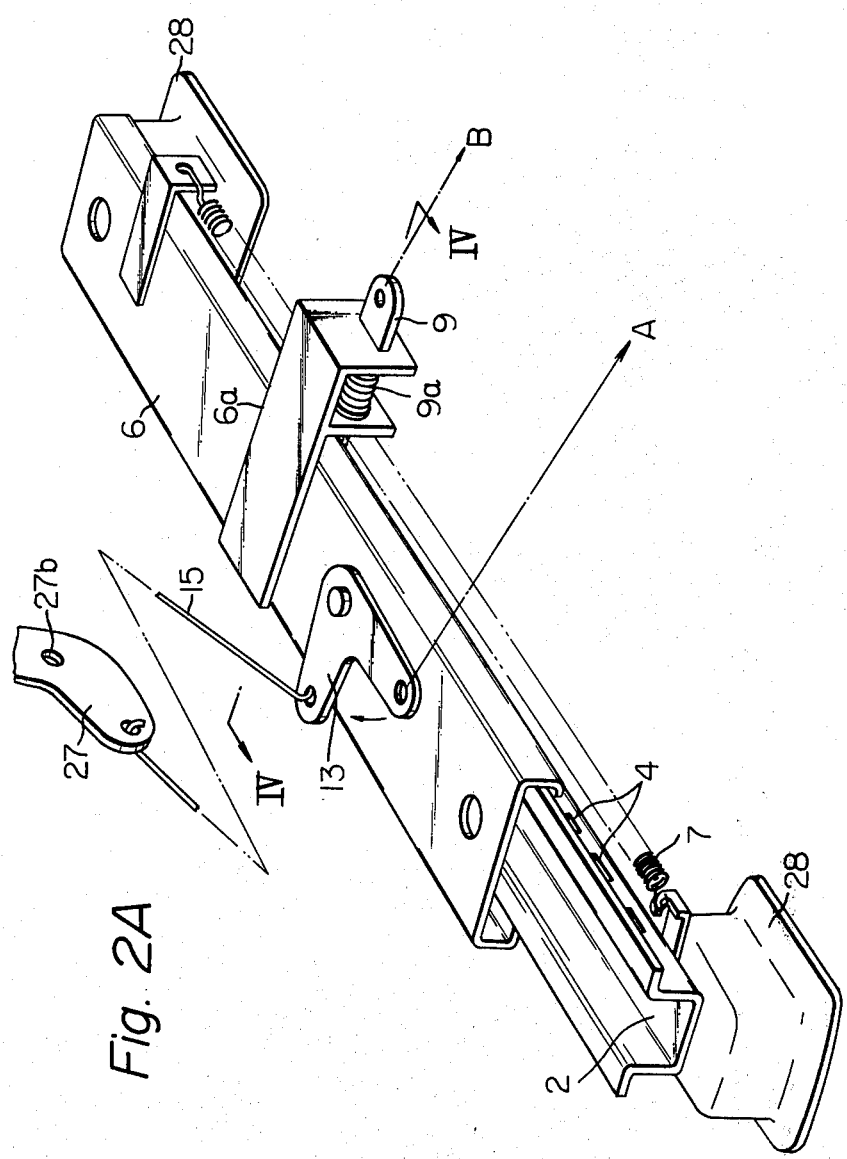

Upon forward tilting movement of the backrest 28, the connecting wire 15 is pulled backward so that the "L" shaped member 13 is rotated in a direction as indicated by the arrow in FIG. 2A. This in turn causes the lever 11 to rotate as indicated by the arrows in FIGS. 2B and 3A, so that the spring-biased latches 8 and 9 are disengaged from the stationary guides 1 and 2, respectively. Under this circumstance, the seat member 25 is urged to slide forward by virtue of the spring 7.

Figure 5:
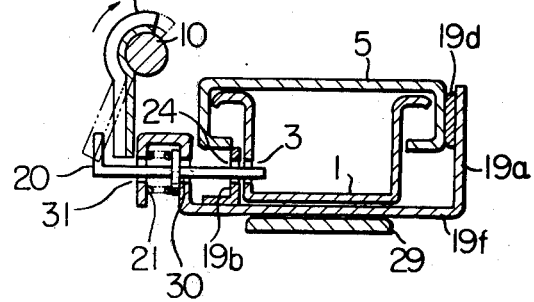
FIG. 5 is a cross-sectional view taken along the line V—V of FIG. 2B.
Figure 6:
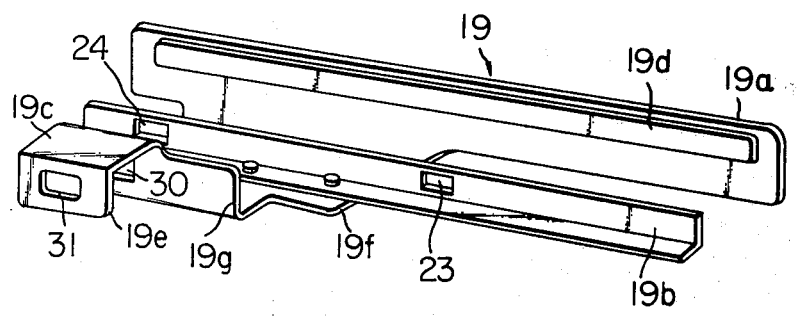
FIG. 6 is a perspective view of a seat position memory element in accordance with the invention.
Figure 7A:
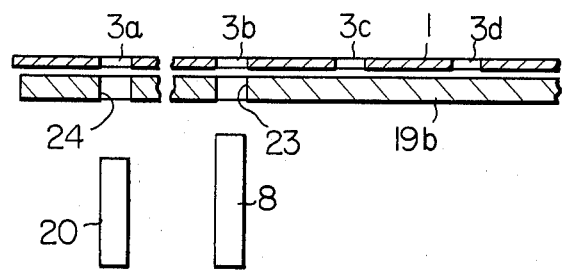
FIGS. 7A, 7B and 7C show relative positions of latch means, the memory element and the stationary guide.
Figure 7B:
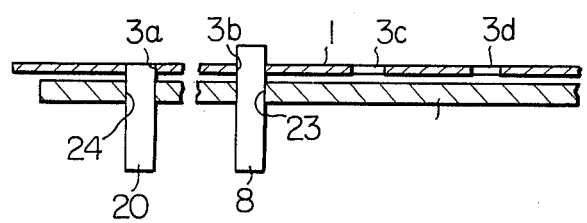

In accordance with the present invention, a seat position memory element 19 is provided between the stationary guide 1 and the slide member 5 (FIGS. 2B, 3A and 6). The memory element 19 comprises an elongate member having a first side wall 19a, a bottom wall 19f, a second side wall 19g in opposed relation to and shorter in length than the first side wall, a downwardly flared portion 19e spaced from the second side wall 19g and an intermediate or third wall 19b which extends parallel with the first wall 19a and has the length substantially equal to the stationary guide 1. The third wall 19b has a first and a second latch receiving slots 24 and 23. The first slot 24 is positioned to be in register with one of the slots 3 of stationary guide 1 and adapted to receive the first spring biased latch 20 therethrough and the second slot 23 is also in register with one of the slots 3 to receive a second spring-biased latch 20. The latch 20 is supported by the second wall 19g and downwardly flared portion 19e through slots 30 and 31 provided thereon and biased toward the intermediate wall 19b by a spring 21 to engage the first slot 24. As illustrated in FIGS. 3A and 5, the position memory element 19 is arranged such that the first side wall 19a slides along the outer side wall of the slide member 5 with a friction reducing member 19d formed of a resin and the third or elongated wall 19b slides along the outer wall of the stationary guide 1 with the bottom wall 19f being slidably supported between the bottom wall of the stationary guide 1 and a support member 29 fixed to the vehicle floor supports 28. The spring-biased latch 20 is normally received in one of the slots 3 of the stationary guide 1 through the first slot 24 of the memory element 19, so that the memory element 19 is normally engaged with the stationary guide 1 when the backrest 28 is in normal upright position. According to the invention, the control shaft 10 is provided with a latch abutment member 22 integrally formed therewith adjacent the backward end thereof (FIGS. 2B and 5). The latch abutment member 22 has a transverse, U-shaped cross-sectional groove and is so positioned on the control shaft 10 as to abut with the upright portion of the latch 20 when the latch 8 comes into engagement with the second slot 23. Upon clockwise rotation of the control shaft 10 as indicated by the arrow in FIG. 2B, the upright portion of the latch 20 is received in the groove formed in the abutment member 22 and moved away from the stationary guide 1 to disengage therefrom so that the position memory element 19 is disengaged from the stationary guide 1 and then is engaged with the slide member 5 through the control shaft 10 which is supported by the slide member 5 (FIG. 5). Simultaneously, the lug 10b of the control shaft 10 comes into abutment contact with the adjacent edge of the opening 11b of the sleeve 11a and the lever 11 is forced to rotate clockwise (FIG. 3B) in a manner similar to that in which the lever 11 is rotated upon forward tilting movement of the backrest 28. Therefore, the clockwise rotation of the control shaft 10 causes the latches 8, 9 as well as latch 20 to disengage from the respective stationary guides and the seat member 25a as well as slide members 5, 6 and intermediate member 19 is are thus free to move along the stationary guides 1 and 2 to permit the passenger to adjust the seat position (FIG. 7A). The position adjustment is made by moving the seat member to any suitable position with the control shaft 10 being held rotated to the extreme end of the clockwise rotation and restoring the control shaft to the normal position, so that the latch 20 is released and comes into engagement with a selected slot 3 of the stationary guide 1. In more detail, as the control shaft 10 is restored to the normal position, the latch 20 of the position memory element 19 is received into a slot 3a and the latch 8 of the slide member 5 is received into a slot 3b through slot 23 of the memory element 19, with the other slots such as 3c and 3d are covered with the non-perforated portion of the memory element 19 as illustrated in FIG. 7B, and the latch 9 is also received in the corresponding slot 4 of the stationary guide 2. Thus, the slide members 5 and 6 are locked in a selected position determined by the latch 20 and the selected slot 3a.

Figure 7C:
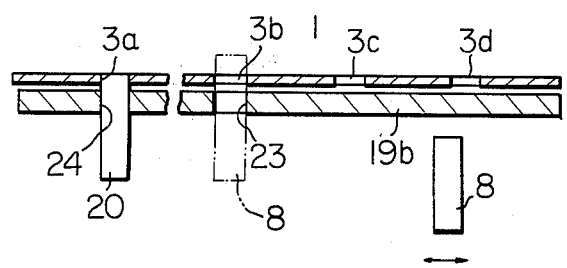

When the seat assembly is in the selected position and the backrest is tilted forward, the latches 8 and 9 are caused to disengage from the stationary guides 1 and 2, respectively, while the latch 20 remains engaged with the stationary guide 1 as shown in FIG. 7C, since the clockwise rotation of the lever 11 due to the forward tilting movement of the backrest 28 provides no coaction with the control shaft 10 as seen from FIG. 3A. The slide members 5 and 6 are thus disengaged from the stationary guides 1 and 2, respectively, while the memory element 19 remains engaged with the stationary guide 1. It is noted that as the seat member 25 is moved forward to permit entry and egress to and from the rear seats, it is only the memory element 19 which remains engaged with the stationary guide 1 by means of the spring-biased latch 20. Upon return movement of the backrest 28 to normal upright position, the latch 8 moves along the inner wall of the intermediate wall 19b of the memory element 19 and is caused to reengage therewith through slot 23 and with the stationary guide 1 through slot 3b as illustrated in broken line in FIG. 7C. It is to be understood that if the strength requirement is met then, the latch 9 may be dispensed with and the slot 23 may be located in any position not necessarily in register with each of the slots 3 of the stationary guide 1.

The foregoing description shows only preferred embodiment of the present invention. Various modifications are apparent to those skilled in the art without departing from the scope of the present invention which is limited by the appended claims. Therefore, the embodiment shown and described is only illustrative, not restrictive.

What is claimed is:

1. A seat position control mechanism for a vehicle seat assembly having a substantially horizontal seat and a normally upright backrest pivotable relative to the seat for forward tilting movement, the control mechanism comprising:

stationary guides having a plurality of spaced latch engaging means and fixedly attached to the vehicle floor under the seat;

slide members slidable on said stationary guides and attached to the seat;

an elongate member disposed parallel with one of said stationary guides and an associated slide member and having first and second latch engaging apertures therein, each being arranged in registry with one of said latch engaging means of said stationary guide;

a first spring-loaded latch on said elongate member and normally engaged with said first aperture and one of said latch engaging means of said stationary guide;

a second spring-loaded latch on said slide member and normally engaged with said second aperture of said elongate member and another latch engaging means of said stationary guide;

a manual control shaft axially rotatably supported by the slide member and engageable with said first and second latches to cause the same to disengage from the respective latch engaging means and said latch engaging apertures when said control shaft is manually turned, the engagement of said control shaft with said first latch being such that said elongate member is movable with said slide member; and means for connecting the backrest with said second latch in such manner that upon the forward tilting movement of the backrest said second latch is disengaged from said another latch engaging means and said second aperture to thereby allow said slide member to be moved forward and then backward to the position determined by the engagement of said first latch with said first latch engaging aperture and said one of the latch engaging means of said stationary guide, and at this position said second latch is engaged in said second aperture and said another latch engaging means.

2. A seat position control mechanism as claimed in claim 1, wherein said control shaft is provided with a transverse abutment member having a generally U-shaped groove engageable with said first latch to disengage the same from the stationary guide upon rotation of said control shaft.

* * * * *